US011935033B2

(12) United States Patent
Jiménez Vitón

(10) Patent No.: US 11,935,033 B2
(45) Date of Patent: Mar. 19, 2024

(54) PROXIMITY-BASED SECURE COMMUNICATION SYSTEM AND METHOD FOR DIGITAL TRANSACTIONS

(71) Applicant: UXPAYMENTS, S.L., Madrid (ES)

(72) Inventor: José Javier Jiménez Vitón, Madrid (ES)

(73) Assignee: UXPAYMENTS, S.L., Madrid (ES)

( * ) Notice: Subject to any disclaimer, the term of this patent is extended or adjusted under 35 U.S.C. 154(b) by 107 days.

(21) Appl. No.: 17/410,207

(22) Filed: Aug. 24, 2021

(65) Prior Publication Data

US 2023/0008112 A1    Jan. 12, 2023

(30) Foreign Application Priority Data

Jul. 7, 2021  (ES) .............................. ES202130641

(51) Int. Cl.
*H04B 5/00* (2006.01)
*G06Q 20/32* (2012.01)
(Continued)

(52) U.S. Cl.
CPC ........ *G06Q 20/3278* (2013.01); *H04W 12/55* (2021.01); *H04W 12/63* (2021.01)

(58) Field of Classification Search
CPC ... H04W 12/06; H04W 12/068; H04W 12/08; H04W 12/30; H04W 12/47; H04W 12/50;
(Continued)

(56) References Cited

U.S. PATENT DOCUMENTS 11,132,665 B2 * 9/2021 Dolcino ............ G06Q 20/3278
2017/0093585 A1 * 3/2017 Lee ........................ H04L 9/14
(Continued)

FOREIGN PATENT DOCUMENTS

EP    3633571 A1    4/2020
EP    3770838 A1    1/2021

OTHER PUBLICATIONS

Coskun, V. et al., "A Survey on Near Filed Communication (NFC) Technology", Wireless Personal Communications, Aug. 2013, pp. 2259-2294, vol. 71, No. 3.
(Continued)

*Primary Examiner* — Tuan Pham
(74) *Attorney, Agent, or Firm* — The Webb Law Firm

(57) ABSTRACT

The present disclosure discloses a proximity-based secure communication system and method for digital transactions. The system comprises: a slave terminal with a near field communication (NFC) radio frequency communication channel, wherein the slave terminal remains in the listening mode in the NFC radio frequency communication channel; and a master electronic device with an NFC radio frequency communication channel. The slave terminal is configured to send an Answer-to-Reset (ATR) to the master electronic device when, by proximity, the slave terminal detects the activation of the NFC radio frequency channel. The slave terminal and the master electronic device exchange Application Protocol Data Unit (APDU) commands that represent a digital transaction by means of the NFC radio frequency channel, such that the master electronic device sends request APDU commands to the slave terminal, and the master electronic device receives reply APDU commands from the slave terminal.

3 Claims, 5 Drawing Sheets

(51) Int. Cl.
*H04W 12/55* (2021.01)
*H04W 12/63* (2021.01)

(58) Field of Classification Search
CPC ... H04W 12/63; G06Q 20/3278; G06Q 20/38; G06Q 20/4012; H04B 5/0031
See application file for complete search history.

(56) References Cited

U.S. PATENT DOCUMENTS

2020/0134601 A1  4/2020  Ding et al.
2021/0012320 A1  1/2021  Lu et al.

OTHER PUBLICATIONS

Cruz, Kelly Cristina de Oliveira, "Estudo sobre o Near Field Communication e seu papel em pagamentos via dispositivos móveis", Feb. 26, 2016, https://repositorio.uniceub.br/jspui/handle/235/8141.

Ok, Kerem et al., "Current Benefits and Future Directions of NFC Services", Education and Management Technology (ICEMT), Nov. 2, 2010, pp. 334-338, IEEE.

Saminger, C. et al., An NFC Ticketing System with a New Approach of an Inverse Reader Moder, 2013 5th International Workshop on Near Field Conference (nfc), Feb. 5, 2013, pp. 1-5, IEEE.

Shoba, Nahar Sunny Suresh et al., "NFC and NFC Payments: A Review", 2016 International Conference on ICT in Business Industry & Government (ictbig), Nov. 18, 2016, pp. 1-7, IEEE.

Svítok, Miroslav, "Implementation of Payment Protocol on NFC-enabled Mobile Phone", Jan. 8, 2014, pp. 1-32, 50-52, https://is.muni.cz/th/ixpsn/thesis.pdf.

Van Den Breekel, Jordi et al., "EMV in a Nutshell", Jun. 29, 2016, pp. 1-37, https://web.archive.org/web/20180403164121if_/http://cs/ru/nl:80/~erikpoll/papers/EMVtechreport.pdf.

* cited by examiner

PROXIMITY-BASED SECURE COMMUNICATION SYSTEM AND METHOD FOR DIGITAL TRANSACTIONS

CROSS-REFERENCE TO RELATED APPLICATION

This application claims priority to Spanish Patent Application No. P202130641 filed Jul. 7, 2021, the disclosure of which is hereby incorporated by reference in its entirety.

BACKGROUND OF THE INVENTION

Field of the Invention

The disclosure falls within the telecommunications sector, and more specifically in telecommunications applied to proximity devices intended for digital transactions wherein goods and services are exchanged.

Description of Related Art

A communication network can enable several data transmission services, such as data transfer and/or exchange. The data transfer and exchange over communication networks has enabled the acquisition of goods and services without the need for the physical exchange of banknotes and/or coins. These digitally processed data transfers are based on a technical definition agreed on between the issuer of the payment element that the buyer holds, and the acquiring party that agrees with the seller to manage the electronic processing of their charges.

These systems started with magnetic stripe cards, then passed on to chip cards, and at present (year 2021) using the smartphones emulating chip cards. All these digital systems designed for carrying out monetary transfers between parties comply with the following basic properties: "Authenticity" of the devices of the parties (users hold cards issued by a recognised and genuine bank, and they interact with cards in a Point-of-Sale (PoS) Terminal device validated by a recognised/genuine acquiring bank). Both parties, buyer and seller, are "Identified" in a reliable manner, ensuring that they are the genuine proprietors of the devices (this is typically achieved with the use of a personal PIN or with a user biometric). "Repudiation" technically assures that neither of the parties can later refuse to voluntarily carry out the transaction. "Integrity" enables the digital system to guarantee by means of cryptographic algorithms that the closed agreement is not manipulated. "Encryption", the system guarantees that the operations are secret and secure between buyer and seller.

All these digital systems have technically evolved to be easier to use and faster, without losing the security that necessarily surrounds the act of the agreement. The main evolution of this digital transfer has taken place in the communication channel used between the acquiring system and the donor system. The state of the art has gone from a channel using data recorded in a magnetic stripe that are read with a magnetic reader, to data recorded in a chip embedded in the plastic card that are read by means of a physical contact enabled by wired communication. The latest technology consists of contactless cards that communicate with the reader by means of radio frequency waves. This latest contactless communication between the buyer's equipment and the seller's equipment (called NFC) is used by smartphones emulating a chip card in a digital "Wallet". In the state of the art, the "charge" terminal (PoS Terminal—Point-of-Sale Terminal) is the "master" and the "payment" smartphone is the "slave". In this way, the charge terminal requests data from the smartphone, and the smartphone answers the charge terminal. Technically, both the smartphone and the charge terminal need to have an NFC "Near Field Communication" antenna, which is a wireless technology working on the 13.56 MHz band under standard ISO 7816, in order to communicate. In some cases, the NFC antenna of the smartphone is limited to certain functions, such as the payment of products and services, and is unrestricted for other functions, such as reading NFC tags, etc.

In the state of the art, patent application EP3770838A1 which is related to a data processing method based on NFC tags, is known. The method disclosed in EP3770838A1 comprises reading the NFC tag, the NFC tag comprising tag content and tag ID; generating an NFC tag payment request based on the tag content and tag ID; analysing the NFC tag payment request and obtaining an analysis reply to the NFC tag payment request; generating an order generation request based on the analysis reply, wherein the order generation request is for causing an order to be generated based on first account information, current transaction information and second account information; generating the order based on the order generation request; and payment step for performing payment based on the order. According to the embodiments of the disclosure, the payment process can be simplified, also, there is no need to set the NFC-specific reading device in the embodiments of the invention, and the cost of merchants can be reduced.

Another document from the state of the art relating to payment by means of NFC technology is the European patent application EP3633571A1. The embodiments of application EP3633571A1 relate to the field of terminal technologies, and disclose an NFC payment method and a terminal, to resolve a problem of the prior art wherein operations are troublesome when a third-party payment application is used to make the payment. The NFC payment method provided in the embodiments of this patent application includes: displaying, by means of a first terminal, at least one third-party payment application based on a preset activation condition; and determining, by means of the first terminal, one of the at least one third-party payment application as a target third-party payment application and interacting with a second terminal by using the target third-party payment application, to complete the NFC payment. The method provided in the embodiments of this application is applied to a process in which a user uses a terminal such as a mobile phone to make the payment.

Lastly, it should be noted that communications between devices by means of NFC technology are regulated by the International Standards Organization by means of ISO 7816 and 14443.

SUMMARY OF THE INVENTION

A first aspect of the disclosure discloses a proximity-based secure communication system for digital transactions. The system of the present disclosure comprises:
- a slave terminal comprising an NFC radio frequency communication channel, wherein the slave terminal is configured to remain in the listening mode in the NFC radio frequency communication channel;
- a master electronic device comprising an NFC radio frequency communication channel activatable by the master electronic device itself.

Wherein the slave terminal is further configured to send an ATR "Answer-To-Reset" to the master electronic device when, by proximity, the slave terminal detects the activation of the NFC radio frequency channel comprised in the master electronic device; and wherein the slave terminal and the master electronic device are further configured to exchange APDU "Application Protocol Data Unit" commands that represent a digital transaction by means of the NFC radio frequency channel, such that the master electronic device sends request APDU commands to the slave terminal, and the master electronic device receives reply APDU commands (for each request APDU command) from the slave terminal.

The system can further comprise an external digital transaction server able to connect with the slave terminal, wherein the external digital transaction server provides data associated with the digital transaction, such as for example the economic amount in a financial transaction, an opening code in an access device, a transport document in transport facilities.

Another aspect of the disclosure discloses a proximity-based secure communication method for digital transactions. The method of the present disclosure comprises:
- selecting a digital transaction means in a master electronic device; and optionally identifying, in the master electronic device, the user by means of an option selected from an alphanumerical code, a numerical code and a biometric;
- activating a listening mode in an NFC radio frequency channel comprised in the slave terminal;
- activating an NFC radio frequency channel comprised in the master electronic device;
- sending an ATR from the slave terminal to the master electronic device when, by proximity, the slave terminal detects the activation of the NFC radio frequency channel comprised in the master electronic device;
- exchanging APDU ("Application Protocol Data Unit") commands that represent a digital transaction by means of the NFC radio frequency channel, wherein the master electronic device sends request APDU commands to the slave terminal, and the master electronic device receives reply APDU commands (for each request APDU command) from the slave terminal.

In one embodiment of the disclosure of the proximity-based secure communication method for digital transactions of the present disclosure, the digital transaction is a financial transaction and the method, after selecting the digital transaction means in a master electronic device, further comprises receiving, in a slave charge terminal, data that represent the financial transaction with at least one piece of data referring to an economic amount. In this embodiment, the method can further comprise identifying, in the master electronic device, the user by means of an option selected from an alphanumerical code, a numerical code and a biometric. In this embodiment, the step of exchanging APDU commands that represent a digital transaction by means of the NFC radio frequency channel, wherein the master electronic device sends request APDU commands to the slave terminal, and the master electronic device receives reply APDU commands from the slave terminal, further comprises:
a) sending APDU commands that represent different methods of payment (type of payment application, debit or credit card) available in the master electronic device;
b) receiving APDU commands that represent the method of payment selected by the slave terminal;
c) sending APDU commands confirming the method of payment selected by the slave terminal;
d) receiving APDU commands that represent an acknowledgment of receipt of the method of payment selected by the slave terminal;
e) sending APDU commands requesting the economic amount comprised in the financial transaction;
f) receiving APDU commands that represent the economic amount comprised in the financial transaction;
g) sending APDU commands requesting if the slave terminal needs to verify the financial transaction by means of a PIN code;
h) receiving APDU commands that represent if the slave terminal needs to verify the financial transaction by means of a PIN code; if it does, go to the following step; otherwise, skip to step "k";
i) sending APDU commands requesting the PIN code;
j) receiving APDU commands that represent the encrypted PIN code;
k) sending APDU commands requesting if the slave terminal has received confirmation of executed financial transaction from an external digital transaction server;
l) receiving APDU commands confirming that the financial transaction has been executed;
m) sending APDU commands requesting acknowledgment of receipt of the financial transaction;
n) receiving APDU commands that represent the acknowledgment of receipt of the financial transaction.

Optionally and with the purpose that the master electronic device can store the information about the digital transaction, the step of exchanging APDU commands can further comprise:
o) receiving APDU commands that represent a receipt of purchase and guarantee for products/services sent to a purchase application associated with the payment means; and
p) sending APDU commands confirming reception of the receipt of purchase and guarantee for products/services sent to the purchase application.

In another embodiment of the disclosure of the proximity-based secure communication method for digital transactions of the present disclosure, the digital transaction is a travel document transaction and the digital transaction means is a travel document. For this embodiment, the step of exchanging APDU commands comprises:
a) sending APDU commands that represent the travel document available in the master electronic device;
b) receiving APDU commands that represent the cancellation of the travel document;
c) sending APDU commands confirming that the travel document has been cancelled;
d) receiving APDU commands that represent the acknowledgment of receipt that the digital transaction has been suitably completed and the travel document correctly cancelled/debited.

In another embodiment of the disclosure of the proximity-based secure communication method for digital transactions of the present disclosure, the digital transaction is an access transaction for physical accesses and the digital transaction means is a digital access key. For this embodiment, the step of exchanging APDU commands comprises:
a) sending APDU commands that represent the digital access key which enables the user to get past the physical access control;
b) receiving APDU commands that represent the confirmation/refusal of access.

For communication to be secure between the master electronic device and the slave terminal, the method of the present disclosure can further comprise the following steps:

Identifying both parties, buyer and seller, in a reliable manner ensuring that they are the genuine proprietors of the devices (this is typically achieved with the use of a personal PIN or with a user biometric).

Technically assuring that neither of the parties can later refuse to voluntarily carry out the digital transaction.

Cryptographically signing the APDU commands exchanged between the master electronic device and the slave terminal so that the digital transaction cannot be manipulated.

Encrypting the APDU commands exchanged between the master electronic device and the slave terminal to assure that the digital transactions are secret and secure.

DETAILED DESCRIPTION OF THE INVENTION

Figure 1:
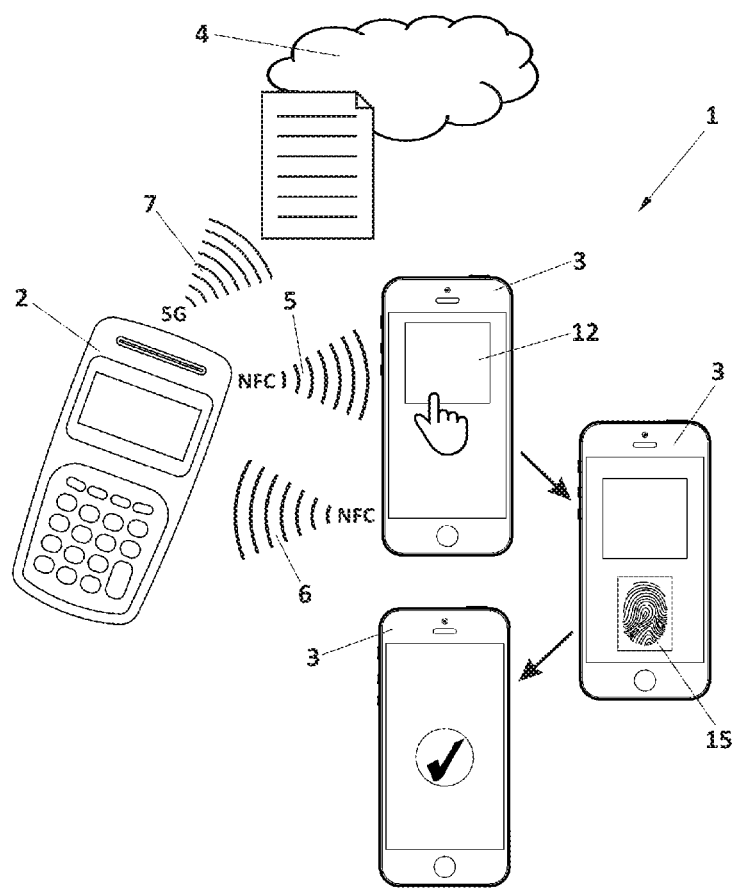
FIG. 1. Proximity-based secure communication system for digital transactions according to the present disclosure.

List of References 1. proximity-based secure communication system for digital transactions according to the present disclosure.
2. slave terminal.
3. master electronic device.
4. external digital transaction server.
5. NFC radio frequency communication channel of the slave terminal 2.
6. NFC radio frequency communication channel of the master electronic device 3.
7. wireless communication channel—3G, 4G, 5G.
8. master terminal from the state of the art.
9. slave electronic device (smartphone/chip card) from the state of the art.
10. proprietor of the digital transaction means and user of the electronic device 2,9.
11, 11', 11". digital transaction according to embodiments shown in FIGS. 3, 4 and 5.
12, 12',12". digital transaction means according to embodiments shown in FIGS. 3, 4 and 5.
13. activating NFC communication and emit radio signal in the state of the art.
14. open NFC communication and listen to radio signal in the state of the art. biometric identification of the user.
16. listening mode in NFC communication channel of the slave terminal 2.
17. activation of NFC communication and emission of radio signal by the master electronic device 3.
18. approximation of the slave terminal 2 to the master electronic device 3 or approximation of the master terminal 8 to the slave electronic device 9.
19, 19', 19". ATR from the slave device terminal 2 to the master electronic device 3.
20-28. APDU commands that the master electronic device 3 sends to the slave terminal 2 in FIG. 3.
29. storage, in the master electronic device 3, of data associated with the products/services acquired by means of the master electronic device 3.
30-37. APDU commands that the master electronic device 3 receives from the slave terminal 2 in FIG. 3.
38-39. not used.
40. ATR from slave electronic device 9 from the state of the art to the master terminal 8 from the state of the art.
41-49. not used.
50-55. APDU commands that the master terminal 8 sends to the slave electronic device 9 in FIG. 2 (state of the art).
56-59. not used.
60-65. APDU commands that the master terminal 8 receives from the slave electronic device 9 in FIG. 2 (state of the art).
71-72. APDU commands that the master electronic device 3 sends to the slave terminal 2 (travel document validating device) in FIG. 4.
73. APDU commands that the master electronic device 3 sends to the slave terminal 2 in FIG. 5.
74-80. not used.
81-82. APDU commands that the master electronic device 3 receives from the slave terminal 2 (travel document validating device) in FIG. 4.
83. APDU commands that the master electronic device 3 receives from the slave terminal 2 in FIG. 5.
110.—digital transaction according to the state of the art.
111, 111'.—economic amount in a financial digital transaction.

FIG. 1 shows the proximity-based secure communication system for digital transactions according to the present disclosure. The system shown in FIG. 3 comprises the slave terminal 2 as part of a products/services provider and the master electronic device 3 as part of a user that uses a product/service of the products/services provider, between which a digital transaction takes place. Examples of digital transactions can be the charge/payment of an economic amount associated with a financial transaction, the validation of the physical access control or the validation of travel documents in public transport facilities. To carry out the digital transaction, the slave terminal 2 communicates with the master electronic device 3 by means of NFC communication "Near Field Communication" which is a wireless technology working on the 13.56 MHz band by means of exchanging APDU "Application Protocol Data Unit" commands, which is all regulated under ISO 7816. For carrying out NFC communication, the slave terminal 2 has the NFC radio frequency communication channel 5 and the master electronic device 3 has the NFC radio frequency communication channel 6. The slave terminal 2 can connect, by means of 3G, 4G or 5G wireless communication 7, with the external digital transaction server 4 for the server 4 to confirm to the slave terminal 2 if it is possible to carry out the digital transaction.

Unlike the state of the art wherein the "charge" terminal 8 is the "master" and the electronic "payment" device 9 is the "slave", in the system 1 of the present disclosure, the "charge" terminal 2 is the "slave" and the electronic "payment" device 3 is the "master". This change in paradigm entails significant changes on a functional level. For example, in the state of the art, the master terminal 8 activates NFC communication and emits the radio signal 13. In contrast, in the present disclosure, the slave terminal 2 activates the NFC radio frequency communication channel 5 and remains in the listening mode until receiving an NFC radio frequency signal from the master electronic device 3. Once the master electronic device 3 is close enough to the slave terminal 2, in the present disclosure, the slave terminal 2 sends an ATR to the master electronic device 3. In contrast, in the state of the art, the master terminal 8 receives the ATR from the slave electronic device 9. After sending the ATR from the slave terminal 2 to the master electronic device 3, APDU commands that represent the digital transaction (11, 11', 11") are exchanged by means of the NFC radio frequency channel. The exchange is carried out such that the master electronic device 3 sends the request APDU commands (APDU requests) to the slave terminal 2, and the master electronic device 3 receives the reply APDU commands (APDU replies) (for each request APDU command) from the slave terminal 2. That is, in the system 1 of the present disclosure, the master electronic device 3 always asks the slave terminal 2, and the slave terminal 2 answers the master electronic device 3 (see FIGS. 3, 4, 5). In contrast, in the state of the art, the master terminal 8 asks and the slave electronic device 9 answers (see FIG. 2).

Figure 2:
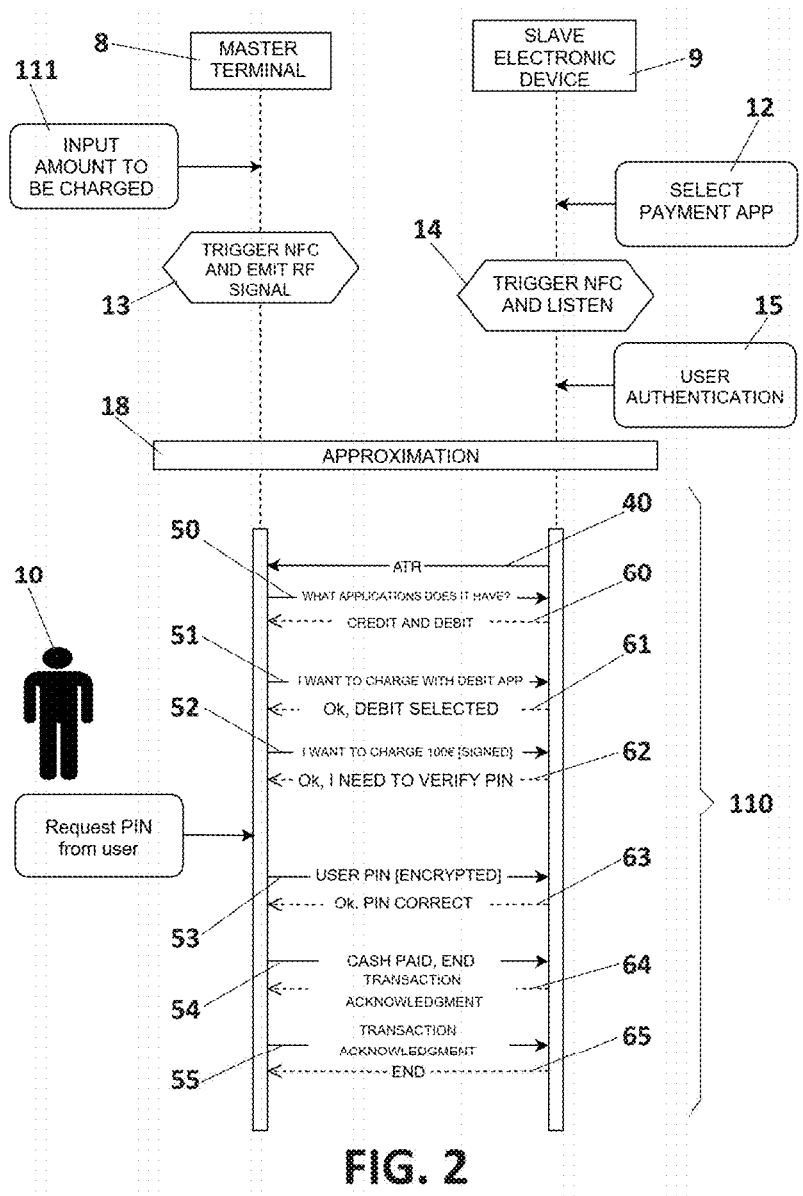
FIG. 2. Proximity-based communication method for digital transactions according to the state of the art.
Figure 3:
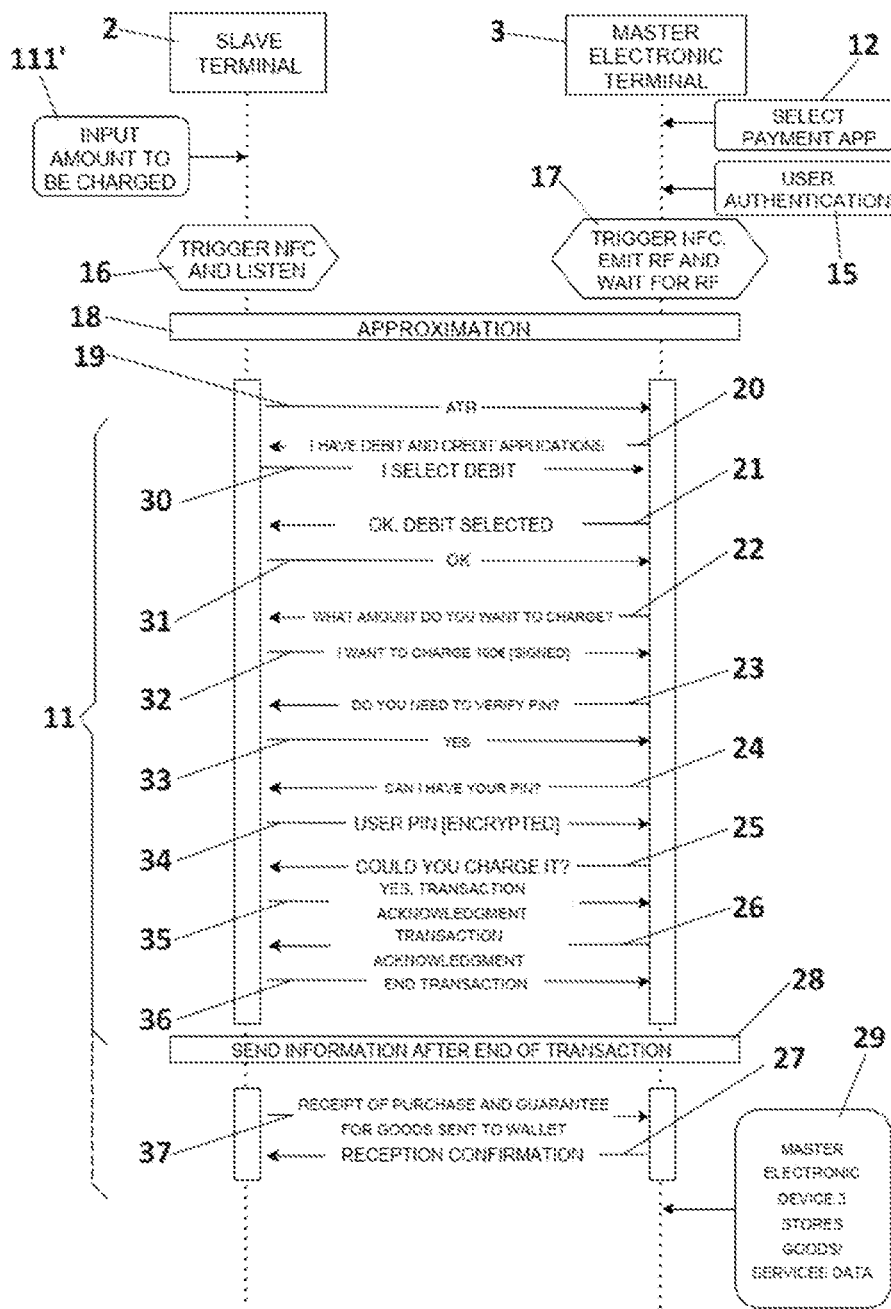
FIG. 3. Proximity-based secure communication method for digital transactions according to the present disclosure applied to financial transactions.
Figure 4:
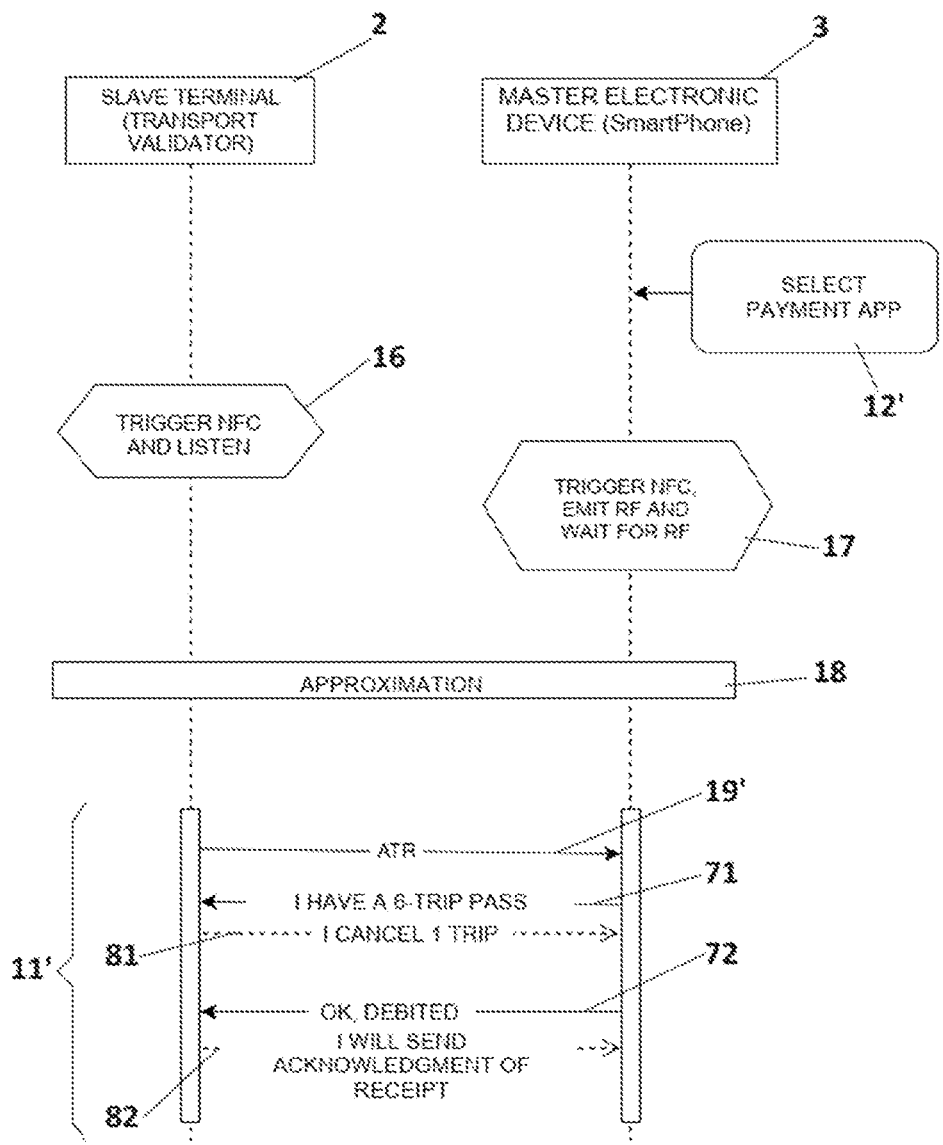
FIG. 4. Proximity-based secure communication method for digital transactions according to the present disclosure applied to access control in transport facilities.
Figure 5:
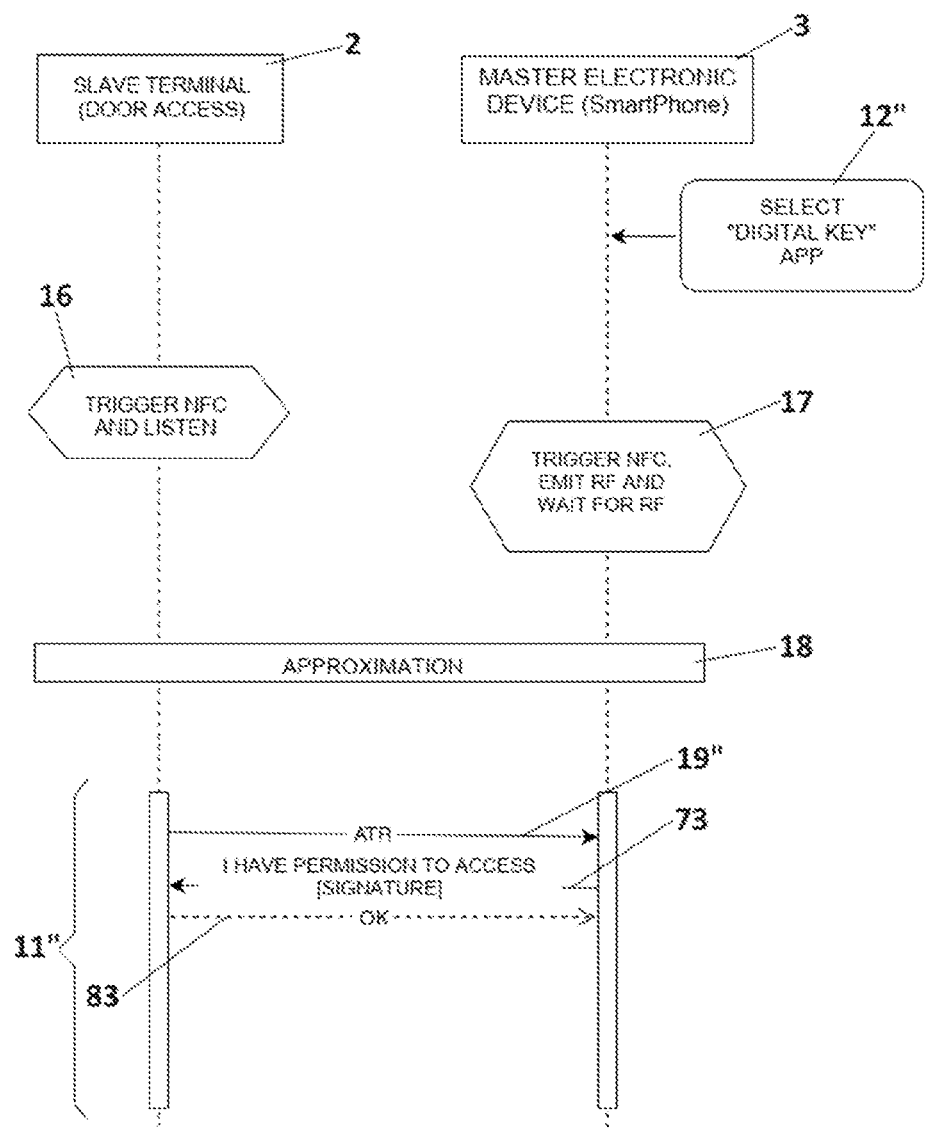
FIG. 5. Proximity-based secure communication method for digital transactions according to the present disclosure applied to access control in means of access.

FIGS. 3, 4 and 5 show diagrams depicting different embodiments of the proximity-based secure communication method for digital transactions of the present disclosure. However, and in order to adequately understanding the method of the present disclosure in its different embodiments, first it is necessary to explain an embodiment of the method according to the state of the art, which is shown in FIG. 2.

Therefore, FIG. 2 shows a proximity-based communication method for digital transactions according to the state of the art. An amount to be charged 111 is entered into the master terminal 8 corresponding to a digital transaction 110 consisting of a financial transaction, which is intended to be executed between the master terminal 8 and the slave electronic device 9. In the slave electronic device 9, the user selects the digital transaction means 12, i.e., the desired form of payment, for example a payment application or a URL of a payment entity. The master terminal 8 activates the NFC communication and emits the radio signal 13. Then, the slave electronic device 9 opens the NFC communication and remains in the listening mode 14 for any NFC radio signal that may be emitted by the master terminal 8. When the slave electronic device 9 listens to (=detects) an NFC radio signal coming from the master terminal 8 because they are both in proximity 18, the slave electronic device 9 enables the user of the slave electronic device 9 to be biometrically identified 15. Biometric identification can be replaced with an alphanumerical identification or the like. Once the user is authenticated 15, the slave electronic device 9 sends the ATR (Answer-To-Reset) 40 to the master terminal 8, and the exchange of APDU ("Application Protocol Data Unit") commands which carry out the digital transaction (financial transaction in this exemplary embodiment) 110 starts, wherein the master terminal 8 sends APDU commands 50-55 (APDU requests) and the slave electronic device 9 answers with APDU commands 60-65 (APDU replies). The commands that the master terminal 8 sends 50-55 and receives 60-65 from the slave electronic device 9 shown in FIG. 2 are the following:

a) sending 50 APDU commands asking about the different methods of payment available in the slave electronic device;

b) receiving 60 APDU commands that represent the different methods of payment available in the slave terminal;

c) sending 51 APDU commands confirming the method of payment selected by the master terminal;

d) receiving 61 APDU commands that represent an acknowledgment of receipt of the method of payment selected by the master terminal;

e) sending 52 APDU commands that represent the economic amount comprised in the financial transaction;

f) receiving 62 APDU commands that represent confirmation of the economic amount comprised in the financial transaction and requests the verification PIN code;

the PIN is requested from the proprietor of the payment means g) sending 53 APDU commands with the PIN code requested from the proprietor of the payment means;

h) receiving 63 APDU commands that represent the PIN code; if the PIN is correct, it goes to the following step; otherwise, transaction is cancelled;

i) sending 54 APDU commands confirming that the financial transaction has been correctly executed in an external digital transaction server;

j) receiving 64 APDU commands acknowledging receipt that the financial transaction has been executed;

k) sending 55 APDU commands acknowledging receipt of the financial transaction;

l) receiving 65 APDU commands that represent the "END" of the financial transaction.

An embodiment for the proximity-based secure communication method for digital transactions of the present disclosure according to FIG. 3 is described in detail below. In the example shown in FIG. 3, the digital transaction is a "financial" transaction. The method of the present disclosure maintains the ISO 7816 standard, but the roles are reversed as explained above, with the terminal 2 now being the "slave" terminal and the electronic device 3 now being the "master" device. Therefore, in the master electronic device 3, the user selects the desired digital transaction means 12 (the form of payment in this embodiment), for example a payment application or a URL of a payment entity. An amount to be charged 111' is entered into the slave terminal 2 corresponding to a digital transaction 11 consisting of a financial transaction, which is intended to be executed between the slave terminal 2 and the master electronic device 3. The master electronic device 3 identifies 15 the user of the master electronic device 3 itself by means of a biometric or any other personal identification code. The slave terminal 2 opens the NFC communication and remains in listening mode 16 for any NFC radio signal that may be emitted by any master electronic device 3. The master electronic device 3 activates 17 the NFC communication and emits the radio signal. When the master electronic device 3 listens to (=detects) an NFC radio signal coming from the slave terminal 2 because they are both in proximity 18, the slave terminal 2 sends the ATR (Answer-To-Reset) 19 to the master electronic device 3, and the exchange of APDU ("Application Protocol Data Unit") commands which carry out the financial digital transaction 11 in this embodiment starts, wherein the master electronic device 3 sends APDU commands 20-26 (APDU requests) and the slave terminal 2 answers with APDU commands 30-36 (APDU replies). The APDU commands that the master electronic device 3 sends 20-26 and receives 30-36 from the slave terminal 2 shown in FIG. 3 are the following:

a) sending 20 APDU commands that represent different methods of payment (type of payment application, debit or credit card) available in the master electronic device;

b) receiving 30 APDU commands that represent the method of payment selected by the slave terminal;

c) sending 21 APDU commands confirming the method of payment selected by the slave terminal;

d) receiving 31 APDU commands that represent an acknowledgment of receipt of the method of payment selected by the slave terminal;

e) sending 22 APDU commands requesting the economic amount comprised in the financial transaction;

f) receiving 32 APDU commands that represent the economic amount comprised in the financial transaction;

g) sending 23 APDU commands requesting if the slave terminal needs to verify the financial transaction by means of a PIN code;

h) receiving 33 APDU commands that represent if the slave terminal needs to verify the financial transaction by means of a PIN code; if it does, it goes to the following step; otherwise, it skips to step "k";
the PIN is requested from the proprietor of the payment means i) sending 24 APDU commands requesting the PIN code;

j) receiving 34 APDU commands that represent the encrypted PIN code;

k) sending 25 APDU commands requesting if the slave terminal has received confirmation of executed financial transaction from an external digital transaction server;

l) receiving 35 APDU commands confirming that the financial transaction has been executed;

m) sending 26 APDU commands requesting acknowledgment of receipt of the financial transaction;

n) receiving 36 APDU commands that represent the acknowledgment of receipt of the financial transaction.

Optionally, for the embodiment shown in FIG. 3, the method of the present disclosure can comprise more APDU commands (27,37) if it is necessary to "send information after the end of the transaction" 28. Therefore, the commands that the master electronic device 3 additionally sends and receives from the slave terminal 2 shown in FIG. 3 are the following:

o) receiving 37 APDU commands that represent a receipt of purchase and guarantee for products/services sent to a purchase application associated with the payment means; and p) sending 27 APDU commands confirming reception of the receipt of purchase and guarantee for products/services sent to the purchase application.

As a consequence of the two preceding steps, the master electronic device 3 keeps 29 in the purchase application comprised therein the proof of purchase with the list of products/services purchased, together with their amount, guarantee and optionally a photograph of the acquired products.

FIG. 4 shows a proximity-based secure communication method for digital transactions according to the present disclosure applied to access control in transport facilities, preferably public transport facilities such as the bus, underground, train, etc. Therefore, in this case the "digital transactions" correspond to "travel document transactions" 11' and the "digital transaction means" is the "travel document" itself, which the user of the transport facilities needs to carry with him or her in order to use the same. Similarly to the embodiment shown in FIG. 3, the method of the present disclosure maintains the ISO 7816 standard, reversing the roles with respect to the state of the art, with the terminal 2 now being the "slave" terminal and the electronic device 3 now being the "master" device. Therefore, in the master electronic device 3, the user selects the "travel document" 12' to be used in order to use the transport. Optionally, the master electronic device 3 identifies 15 the user of the master electronic device 3 itself by means of a biometric or any other personal identification code. The slave terminal 2 opens the NFC communication and remains in listening mode 16 for any NFC radio signal that may be emitted by any master electronic device 3. The master electronic device 3 activates 17 the NFC communication and emits the radio signal. When the master electronic device 3 listens to (=detects) an NFC radio signal coming from the slave terminal 2 because they are both in proximity 18, the slave terminal 2 sends the ATR (Answer-To-Reset) 19' to the master electronic device 3, and the exchange of APDU ("Application Protocol Data Unit") commands which carry out the digital transaction starts, wherein the master electronic device 3 sends APDU commands 71-72 (APDU requests) and the slave terminal 2 answers with APDU commands 81-82 (APDU replies). There are APDU commands included in ATR 19' whereby the master electronic device 3 knows that it is in specific transport facilities (bus, underground, train) in a specific location. The APDU commands that the master electronic device 3 sends 71-72 and receives 81-82 from the slave terminal 2 shown in FIG. 4 are the following:

a) sending 71 APDU commands that represent the travel document available in the master electronic device;

b) receiving 81 APDU commands that represent the cancellation of the travel document;

c) sending 72 APDU commands confirming that the travel document has been cancelled;

d) receiving 82 APDU commands that represent the acknowledgment of receipt that the digital transaction has been adequately completed and the travel document correctly cancelled/debited.

FIG. 5 shows a proximity-based secure communication method for digital transactions according to the present disclosure applied to access control in physical access means such as a door of a hotel room. Therefore, in this case the "digital transactions" correspond to "access transactions" 11" and the "digital transaction means" is a "digital access key", which the user of the access means needs to carry. Similarly to the embodiment shown in FIG. 3, the method of the present disclosure maintains the ISO 7816 standard, reversing the roles with respect to the state of the art, with the terminal 2 now being the "slave" terminal and the electronic device 3 now being the "master" device. Therefore, in the master electronic device 3, the user selects the "digital key" 12" to be used in the physical access control. Optionally, the master electronic device 3 identifies 15 the user of the master electronic device 3 itself by means of a biometric or any other personal identification code. The slave terminal 2 opens the NFC communication and remains in listening mode 16 for any NFC radio signal that may be emitted by any master electronic device 3. The master electronic device 3 activates 17 the NFC communication and emits the radio signal. When the master electronic device 3 listens to (=detects) an NFC radio signal coming from the slave terminal 2 because they are both in proximity 18, the slave terminal 2 sends the ATR (Answer-To-Reset) 19" to the master electronic device 3, and the exchange of APDU ("Application Protocol Data Unit") commands which carry out the digital transaction starts, wherein the master electronic device 3 sends APDU commands 73 (APDU requests) and the slave terminal 2 answers with APDU commands 83 (APDU replies). There are APDU commands included in ATR 19" whereby the master electronic device 3 knows that it is in front of a specific physical access control (door of a hotel, sports facility, etc.) of a specific facility. The APDU commands that the master electronic device 3 sends 73 and receives 83 from the slave terminal 2 shown in FIG. 5 are the following:

a) sending 73 APDU commands that represent the digital access key which enables the user to get past the physical access control;

b) receiving 83 APDU commands that represent the confirmation/refusal of access.

The invention claimed is:

1. A proximity-based secure communication method for digital transactions comprising:

selecting a digital transaction means in a master electronic device, wherein the digital transaction is a financial transaction and the digital transaction means comprises payment means;

receiving, in a slave charge terminal, data that represent the financial transaction with at least one piece of data referring to an economic amount;

activating a listening mode in a first near field communication (NFC) radio frequency channel comprised in the slave terminal;

activating a second NFC radio frequency channel comprised in the master electronic device;

sending an Answer-to-Reset (ATR) from the slave terminal to the master electronic device when, by proximity, the slave terminal detects an activation of the second NFC radio frequency channel comprised in the master electronic device; and exchanging Application Protocol Data Unit (APDU) commands that represent a digital transaction by means of the second NFC radio frequency channel, wherein the master electronic device sends request APDU commands to the slave terminal, and the master electronic device receives reply APDU commands from the slave terminal, wherein the step of exchanging APDU commands further comprises:

(a) sending APDU commands that represent the payment means available in the master electronic device;

(b) receiving APDU commands that represent the payment means selected by the slave terminal;

(c) sending APDU commands confirming the payment means selected by the slave terminal;

(d) receiving APDU commands that represent an acknowledgment of receipt of the payment means selected by the slave terminal;

(e) sending APDU commands requesting the economic amount comprised in the financial transaction;

(r) receiving APDU commands that represent the economic amount comprised in the financial transaction;

(g) sending APDU commands requesting if the slave terminal needs to verify the financial transaction by means of a PIN code;

(h) receiving APDU commands that represent if the slave terminal needs to verify the financial transaction by means of a PIN code; if it does, go to the following step;

otherwise, skip to step (k);

(i) sending APDU commands requesting the PIN code;

(j) receiving APDU commands that represent the encrypted PIN code;

(k) sending APDU commands requesting if the slave terminal has received confirmation of executed financial transaction from an external digital transaction server;

(l) receiving APDU commands confirming that the financial transaction has been executed;

(m) sending APDU commands requesting acknowledgment of receipt of the financial transaction; and (n) receiving APDU commands that represent the acknowledgment of receipt of the financial transaction.

2. The proximity-based secure communication method for digital transactions according to claim 1, wherein the method further comprises identifying, in the master electronic device, a user by means of an option selected from an alphanumerical code, a numerical code, and a biometric.

3. The proximity-based secure communication method for digital transactions according to claim 1, wherein the step of exchanging APDU commands further comprises:

(o) receiving APDU commands that represent a receipt of purchase and guarantee for a plurality of products and/or services sent to a purchase application associated with the payment means; and (p) sending APDU commands confirming reception of the receipt of purchase and guarantee for the plurality of products and/or services sent to the purchase application.

* * * * *